United States Patent [19]
Steinman et al.

[11] Patent Number: 5,890,155
[45] Date of Patent: Mar. 30, 1999

[54] SYSTEM AND METHODS FOR PROVIDING ENCAPSULATED AND PERFORMANCE-EFFICIENT DATA REFERENCES IN AN OBJECT-ORIENTED CONTROLLER AND DISTRIBUTED CONTROL SYSTEM EMPLOYING THE SAME

[75] Inventors: Jethro F. Steinman, Havertown; Richard P. Himmer, Blue Bell; M. Gulam Kanji, Allentown, all of Pa.

[73] Assignee: Honeywell Inc., Minneapolis, Minn.

[21] Appl. No.: 920,258

[22] Filed: Aug. 22, 1997

[51] Int. Cl.[6] .................................................. G06F 17/30
[52] U.S. Cl. ............................. 707/9; 707/103; 707/104; 395/186
[58] Field of Search ................................ 707/9, 103, 104; 395/186

[56] References Cited

U.S. PATENT DOCUMENTS

| | | | |
|---|---|---|---|
| 4,823,257 | 4/1989 | Tonomura | 395/707 |
| 5,125,091 | 6/1992 | Stass, Jr. et al. | 395/671 |
| 5,761,883 | 6/1998 | Pruett et al. | 53/448 |
| 5,765,153 | 6/1998 | Benantar et al. | 707/9 |
| 5,802,276 | 9/1998 | Benantar et al. | 395/186 |

*Primary Examiner*—Paul R. Lintz
*Attorney, Agent, or Firm*—Hitt Chwang & Gaines

[57] ABSTRACT

A system for, and method of, providing encapsulated and performance-efficient data references in an object-oriented controller and a distributed, real time process control system employing the system or the method. In one embodiment, the system includes: (1) a client algorithm block that generates a request for an address to enable the client algorithm block to gain direct access to data stored at the address and (2) a supplier algorithm block, that receives and evaluates the request and: (2a) if the supplier algorithm block grants the request, communicates the address to the client algorithm block, allowing the client algorithm block to gain direct access to the data and (2b) if the supplier algorithm block denies the request, withholds the address, forcing the client algorithm block to gain indirect access to the data.

20 Claims, 2 Drawing Sheets

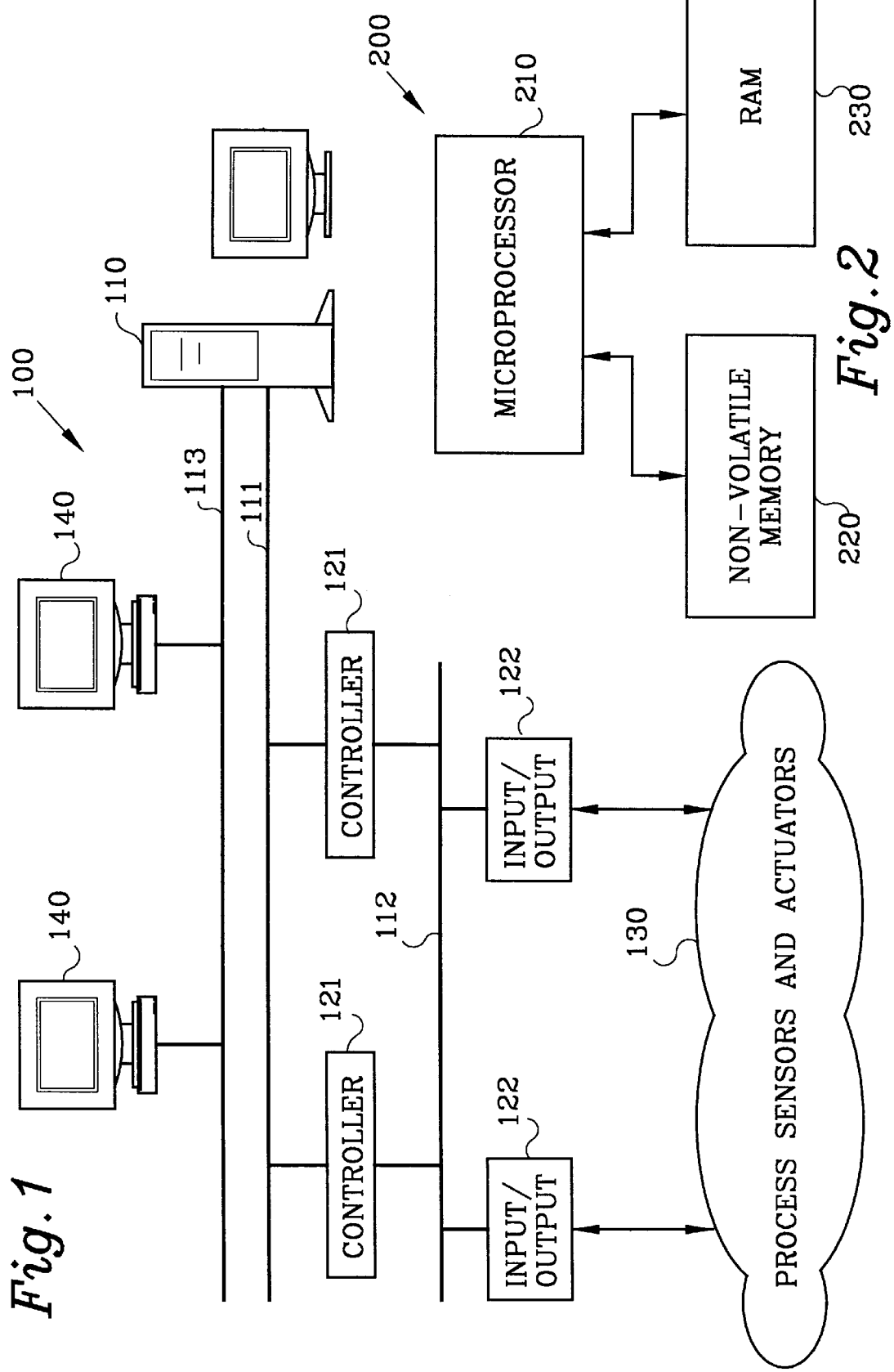

SYSTEM AND METHODS FOR PROVIDING ENCAPSULATED AND PERFORMANCE-EFFICIENT DATA REFERENCES IN AN OBJECT-ORIENTED CONTROLLER AND DISTRIBUTED CONTROL SYSTEM EMPLOYING THE SAME

TECHNICAL FIELD OF THE INVENTION

The present invention is directed, in general, to computing and processing systems and, more specifically, to computing and processing systems that provide both encapsulated and performance-efficient data references in an object-oriented controller and a distributed control system employing the same.

BACKGROUND OF THE INVENTION

Automated process control systems include a comprehensive set of algorithms, or software-definable process control routines, to control and monitor various processes within, for instance, a manufacturing facility. The control systems can be tailored to satisfy a wide range of process requirements globally or within specified portions of the facility. Conventionally, the control systems include a variety of modules, each having its own processor or firmware, linked together by communication buses to result in a distributed process control system. The distributed nature of the system affords high performance with the capability to expand the system incrementally to satisfy growth or modifications in the facility.

Process control systems generally provide a means by which users can create custom control strategies, e.g., software-definable process control routines. A complete control strategy may be built from smaller components called "blocks," "parameters," and "connections." A block is a software construct used to encapsulate the data and the algorithms of elemental control computations; parameters define the interface to individual pieces of data within the blocks; and connections allow data to flow between the parameters of blocks.

Software used to implement a real-time process controller can be based on different design philosophies. One philosophy is to use an object oriented approach in which the algorithms and data which encompass elemental control algorithms are implemented within encapsulated objects; using this philosophy, the "blocks" are objects whose attributes are contained "parameters" and whose behaviors are the implemented control algorithms. This approach has several advantages, including: close coupling of the control algorithm with its data; the capability for the algorithm, as data owner, to qualify changes to the data; and the capability for the algorithm, as data owner, to "communicate" with system users about the validity of requested state changes.

The object-oriented approach, however, has the disadvantage that it can cause more processing overhead than other approaches. In a pure object-oriented approach, no outside algorithm is given access to the parameters of a block without the intervention of the block itself, which requires the block to execute a subroutine to read or write a parameter. In some cases, subroutine execution is appropriate and the overhead is not significant; in other cases, however, the subroutine execution is wasteful of processing resources.

Therefore, what is needed in the art are systems and methods for providing encapsulated and performance-efficient data references in an object-oriented controller, and a distributed control system employing the same; the systems and methods should provide a means whereby block designers of control blocks can be allowed to select parameter access through subroutine execution or through a less encapsulated, but more efficient, form of access, defined herein as "intimate" access.

SUMMARY OF THE INVENTION

To address the above-discussed deficiencies of the prior art, it is a primary object of the present invention to provide multiple types of data access to render algorithm block design more flexible and data transfer more efficient.

In the attainment of the above primary object, the present invention provides a system for, and method of, providing encapsulated data references in an object-oriented controller and a distributed, real time process control system employing the system or the method. In one embodiment, the system includes: (1) a client algorithm block that generates a request for an address to enable the client algorithm block to gain direct access to data stored at the address and (2) a supplier algorithm block, that receives and evaluates the request and: (2a) if the supplier algorithm block grants the request, communicates the address to the client algorithm block, allowing the client algorithm block to gain direct access to the data and (2b) if the supplier algorithm block denies the request, withholds the address, forcing the client algorithm block to gain indirect access to the data.

The present invention therefore introduces the concept of providing multiple types of data access; direct access is generally faster, since the supplier algorithm block need not be involved in the access, while indirect access is generally safer, since the supplier algorithm block controls the access.

In one embodiment of the present invention, the client algorithm block generates the request at configuration time. Thus, the connections that provide pathways for data interchange can be defined when the system is configured, rather than at runtime, when timing constraints may be present. Of course, the present invention is not limited to generation at configuration time.

In one embodiment of the present invention, the supplier algorithm block forces the client algorithm block to gain indirect access to the data through an explicit subroutine call. Those skilled in the art are familiar with "get" and "store" subroutines that, in the prior art, provided the exclusive means of data access. The present invention still allows use of such subroutines in the context of indirect access.

In one embodiment of the present invention, the supplier algorithm block evaluates the request differently for each parameter based on predetermined rules. These rules can be motivated by a variety of considerations including, but not limited, to the following: whether the parameter has an assigned storage cell or is computed at time of access; whether fast access is important for the parameter; and whether allowing intimate access would significantly increase the chance of software failure.

In one embodiment of the present invention, the data is associated with a parameter, the parameter including information pertaining to at least one selected from the group consisting of: (1) whether direct access is supported, (2) a location of an associated cell if direct access is supported and (3) a location of the server algorithm block if direct access is not supported. These and other types of information may be employed to identify the alternative ways in which the data may be accessed.

In one embodiment of the present invention, the address is contained in a persistent pointer associated with the client algorithm block. Those skilled in the art are familiar with persistent objects and, by implication, persistent pointers to memory addresses. The present invention can make use of pointer persistence to render the creation of connections between algorithm blocks more efficient.

In one embodiment of the present invention, the control system is a distributed, real time process control system. Those skilled in the art will, however, readily perceive other uses in object-oriented applications for the multiple levels of data access that the present invention provides.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following detailed description taken in conjunction with the accompanying drawings, in which like numbers designate like parts, and in which:

FIG. 1 illustrates a functional diagram of an exemplary distributed, real-time process control system with which the present invention may suitably be used;

FIG. 2 illustrates a high-level block diagram of an exemplary digital processing system that may be employed to execute software-definable process control routines embodying the principles of the present invention;

DETAILED DESCRIPTION

Figure 3:
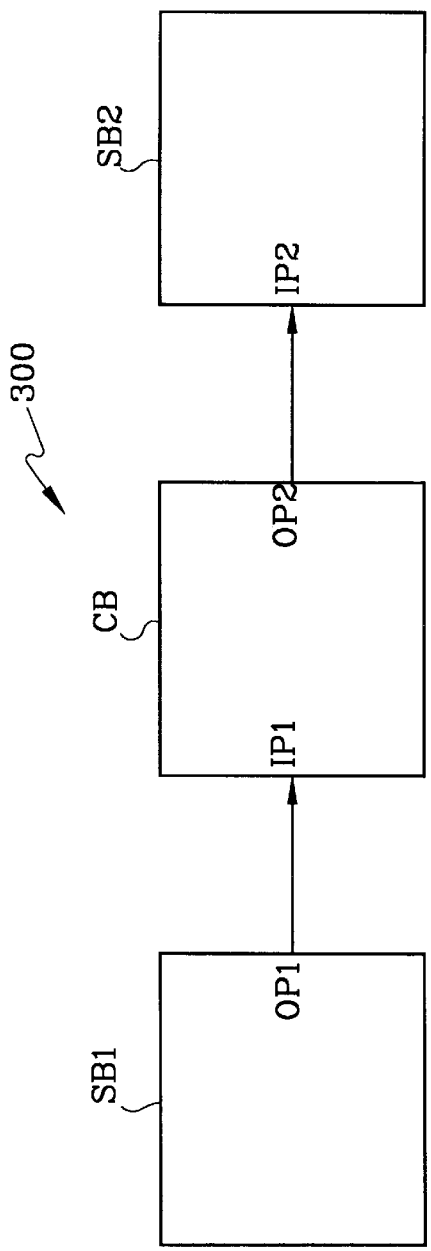
FIG. 3 illustrates a block schematic of an exemplary software-definable application using algorithm blocks employing the principles of the present invention.

Before undertaking a description of an exemplary embodiment of the systems and methods of the present invention, it will be helpful to describe a computing or processing system environment in which the present invention may suitably be used or implemented. Referring initially to FIG. 1, illustrated is a functional diagram of an exemplary distributed, real-time process control system (generally designated 100) with which the present invention may suitably be used.

Process control system 100 illustratively includes a computer network having a server 110 and a controller network 111. The controller network 111 provides an interface between the server 110 and process controllers (generally designated 121); the controller network 111 may, for example, carry supervisory messages between the server 110 and process controllers 121, and peer-to-peer messages between the process controllers 121. The process controllers 121 communicate with input/output ("I/O") devices 122 via an I/O network 112. The process controllers 121 are adapted to execute software-definable process control routines for controlling and receiving data from process sensors and actuators 130 via I/O devices 122 and I/O network 112. Those skilled in the art are familiar with various types of process sensors and actuators 130, such as electrically-controllable motors, valves, pumps, etc., that may be employed in the manufacture of sundry products; the principles of the present invention are not limited to a specific process or processing system, however, but may readily be employed to advantage in any such system.

In one embodiment, the process control system 100 further includes a local area network ("LAN") 113 that provides an interface between the server 110 and remote workstations (generally designated 140). The remote workstations 140 may be used by system operators to control and monitor the operation of the process control system 100. Although illustrated as a separate network, the LAN 112 and controller network 111 may be the same; i.e., the remote workstations 140 and the process controllers 120 may share the same network transmission medium. Those skilled in the art will recognize, however, that providing separate networks for control systems and operator workstations may enhance the reliability of a distributed, real-time process control system; e.g., network traffic on LAN 112 associated with distributing process-related data from server 110 to operator workstations 140 will not interfere with process control information transmitted between server 110 and remote process controllers 120 via control network 111.

Software-definable process control routines may be executed by any digital processing system, such as server 110, workstations 140, or process controllers 121. FIG. 2 illustrates a high-level block diagram of an exemplary digital processing system 200 that may be employed to execute software-definable process control routines embodying the principles of the present invention. Exemplary digital processing system 200 includes a microprocessor 210, non-volatile memory 220, and random access memory ("RAM") 230. Non-volatile memory 220, which is employed to store software-definable process control routines, may comprise, for example, a programmable read-only memory ("PROM"), flash ROM, or a magnetic storage medium. The software-definable process control routines stored in non-volatile memory 220 are executed by microprocessor 210. The microprocessor employs RAM 230 to store all or portions of the process control routines as the routines are executed, as well as storage for process control data associated with process sensors and actuators 130. The description of exemplary digital processing system 200 is merely illustrative; those skilled in the art will recognize that software-definable process control routines employing the principles of the present invention are not limited to a specific hardware implementation for digital processing system 200, and that all such systems are within the scope of the claims recited hereinafter.

Within a process controller employing object-oriented programming, i.e., an "object-oriented controller," algorithms and their associated data can be implemented as objects called "blocks." Data within a block can be read from, or written to, named attributes of blocks, called "parameters." Data flow between different blocks can be accomplished by establishing a "connection" from an output parameter of one block to an input parameter of a second block.

According to the principles of the present invention, when a connection is established between two blocks, one block holds information that serves as a "reference;" the reference defines which block, and which parameter of that block, is to be accessed for purposes of affecting data flow between the two blocks. A reference can also provide descriptive information such as the data type of the parameter which is referenced, e.g., boolean or integer. A reference can be held by a block with an input parameter and point to an output parameter of a second block, in which case the data flow could be characterized as a "pull" technique through which the block with the input parameter "gets," or "requests," data from the block with the output parameter. Alternatively, a reference can be held by a block with an output parameter and point to an input parameter of a second block, in which case the data flow could be characterized as a "push" technique through which the block with the output parameter "stores" data to the input parameter of the second block.

Regardless of whether a process controller design uses a "pull" or "push" technique, or both, a block which holds a reference is referred to herein as a "client algorithm block," or simply "client" or "client block," while a block which holds a referenced parameter is referred to herein as a "supplier algorithm block," or simply "supplier" or "supplier block." Conceptually, a client can be thought of as causing the execution of an operation or method upon a supplier block in order to affect data flow between the blocks. In addition, as described more fully hereinafter, a supplier provides the procedure which implements the data flow from the supplier to the client; e.g., a client may gain "direct," or "indirect," access to the desired data. In addition, a procedure which implements data flow can do more than merely respond with the requested data; for example, the procedure may perform ancillary computations on the data prior to answering a request for such data.

In one embodiment, when a reference is received by a client, it is in an external form which must be converted to an internal form directly suitable to parameter access within the controller; the process of rendering this conversion is referred to herein as "binding." Binding can be done as part of a set-up operation through which a block receives its configuration data; it may also be triggered as part of run-time execution if a referenced block and parameter come into existence after the reference itself. In general, a client block will have enough information to perform the binding operation; a client block may perform the binding operation itself or, alternatively, a client block may rely on a support agent which handles the routine operations associated with binding. In either case, however, as described in more detail hereinafter, the binding process ultimately results in the execution of one of two procedures upon the supplier block; a "BindGet( )" procedure is invoked if the need is to bind for "get" privileges, or a "BindStore( )" procedure is invoked if the need is to bind for "store" privileges. Each bind request contains enough information to identify which parameter is to be referenced.

For purposes of illustration and explanation of the principles of the present invention, reference is now made to FIG. 3, which illustrates a block schematic of an exemplary software-definable application 300 using algorithm blocks employing the principles of the present invention. The application 300 includes supplier blocks SB1 and SB2 and client block CB. Supplier block SB1 has an output parameter OP1 which is connected to an input parameter IP1 of client block CB, and the client block CB has an output parameter OP2 which is connected to an input parameter IP2 of supplier block SB2; at execution time, the connections between the parameters cause data to flow in the direction of the arrows.

For a particular application, the algorithm blocks, i.e., supplier blocks SB1, SB2 and client block CB, may embody any desired software-definable process, which may operate on, use, or produce data held, for example, by input parameters IP1, IP2, or output parameters OP1, OP2; the principles of the present invention are not limited to specific algorithms or processes executed by blocks, but are concerned with the manner in which data is shared between blocks. Thus, for purposes of illustration only, it is assumed that client block CB includes a collection of algorithms having the following characteristics: (1) input parameter IP1 has an associated connector that provides a connection to output parameter OP1 of supplier block SB1; when client block CB executes, it uses the connector reference to "pull," or "get," the value of output parameter OP1 from supplier block SB1; (2) output parameter OP2 has an associated connector that provides a connection to input parameter IP2 of supplier block SB1; when client block CB executes, it uses the connector reference to "push," or "store," the value of output parameter OP2 to input parameter IP2 of supplier block SB2.

It is also assumed, for purposes of illustration, that supplier block SB1 supports "intimate" "get" access for output parameter OP1, and that supplier block SB2 does not support intimate "store" access for input parameter IP2, thus requiring that data writes to input parameter IP2 be processed by a Store ( ) subroutine in supplier block SB2. As used herein, "intimate," or "direct," data access means that a first block can gain access to data held by a parameter of a second block without requiring execution by the second block of conventional subroutines used to access the data; the term "access," as used herein, includes both the writing, or "storing," and reading, or "getting," of data held by a parameter of a block.

Figure 4:
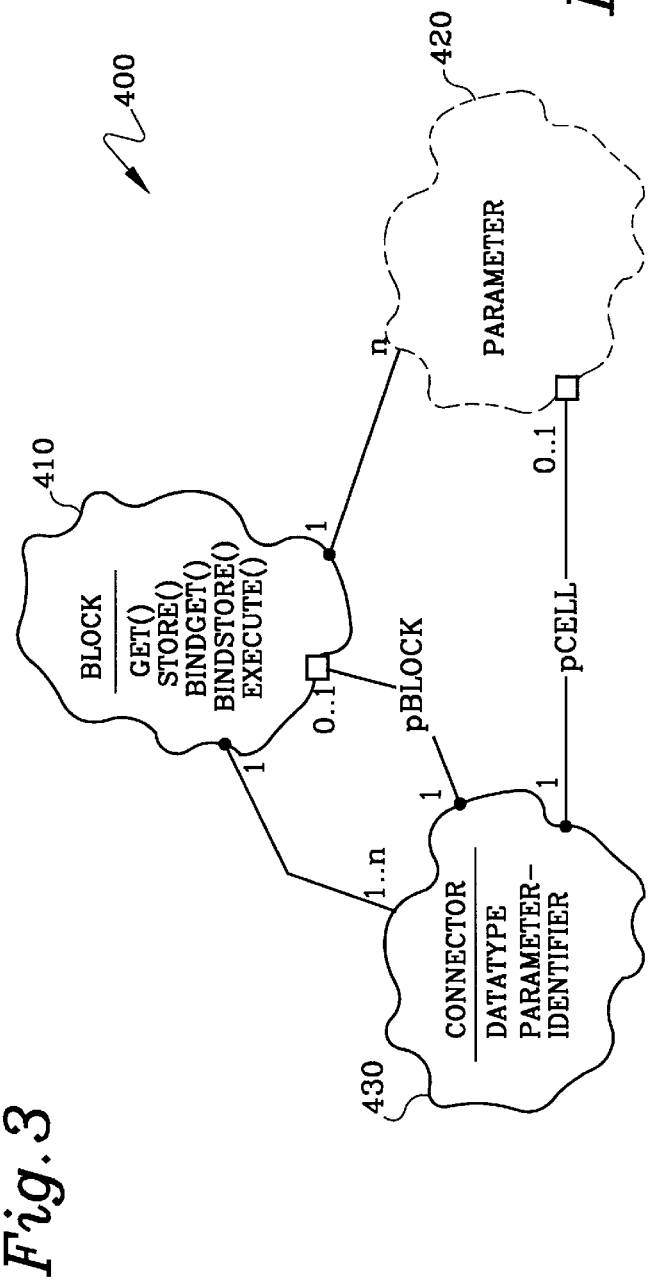
FIG. 4 illustrates a connections subsystem class diagram for the design of algorithm blocks employing the principles of the present invention.

Turning now to FIG. 4, illustrated is a connections subsystem class diagram 400 for the design of algorithm blocks employing the principles of the present invention. The diagram 400 is rendered in Booch notation; those skilled in the art may be familiar with Booch notation as described by Grady Booch in *Object Oriented Analysis and Design With Applications*, Benjamin/Cummings, 1994, which is incorporated herein by reference. Diagram 400 illustrates the structural elements, or "classes," used in the design of algorithm blocks that support data transfer over connections; "block," "parameter," and "connector" are different types of classes, a description of each and their containment relationships with other classes is provided herebelow. Each instance of a block 410, which comprises the fundamental constituent of object-oriented process control strategies, contains one or more parameters 420 which form the data elements of a block 410. Within a specific control strategy, blocks are linked together by one or more connectors 430.

As noted above, instances of the "block" class form the fundamental constituent from which object-oriented process control strategies can be constructed. A block contains instances of "parameters" and "connectors;" parameters make up the data elements of a block; connectors allow a block to hold reference data to parameters of other blocks. As described hereinafter, a control algorithm performed by a block may be expressed in an "Execute( )" procedure; an exemplary Execute( ) procedure is provided below. Access to parameters owned by a block occurs when a client block invokes the Get( ) procedure for read access, or the Store( ) procedure for write access. The procedures BindGet( ) and BindStore( ) are called by a client block, or an agent acting for the client block, to fill out the value of their own connectors through the binding procedure. A specific implementation of the BindGet( ) procedure determines for which parameters a block allows intimate get access and for which parameters the block allows get access only by method invocation. Similarly, the specific implementation of the BindStore( ) procedure determines for which parameters the block allows intimate store access and for which parameters the block allows store access only by method invocation. In the exemplary software-definable application 300, there are three instances of the block class, supplier blocks SB1 and SB2, and client block CB. Exemplary PDL samples are presented below for several sample procedures employed in the block class to implement the principles of the invention, including exemplary Get( ), Store( ), BindGet( ), BindStore ( ), and Execute( ) procedures; the sample procedures are intended to show, at a high level of abstraction, the type of processing performed by each procedure. Those skilled in the art will note that the code necessary to implement specific block methods is distinct for each type of block; the PDL samples provided below are directed to the blocks depicted in the exemplary software-definable application 300.

Instances of the "parameter" class form the individual pieces of data which make up the data base of a block. In an object-oriented process control strategy, parameter values held by one block are read and written by other blocks through the agency of connections, or the "connector" class. Parameter values may also be read by human interface devices within the process control system to allow plant personnel to monitor process changes. The "parameter" class does not instantiate any other classes. In the exemplary software-definable application 300, there are four instances of the parameter class; input parameters IP1 and IP2, and output parameters OP1 and OP2.

According to the principles of the present invention, instances of the "connector" class hold the reference data that allows a client block to access parameters of a supplier block; a connector holds instances of "DataType," "ParameterIdentifier," "pCell," and "pBlock." In the exemplary software-definable application 300, there are two instances of the connector class; the connector associated with the input parameter IP1 of client block CB, and the connector associated with the output parameter OP2 of client block CB.

Within an application, there is at least one connector for each connection. When reference data within a connector denotes an output parameter, the client block which owns the connector "pulls" data across the connection. When reference data within a connector denotes an input parameter, a client block which owns the connector "pushes" data across the connection. A connector holds more than one type of information to describe a reference; it holds the data type of the referenced parameter, an identifier of the referenced parameter in external form, and an identifier of the referenced parameter in internal form.

As used in the exemplary PDL procedures provided herein, an external identifier is called "ParameterIdentifier;" the principles of the present invention are not limited to a particular format for this identifier, e.g., it can be textual, numeric, or a combination, provided it is capable of uniquely designating a particular parameter within a particular block. As also used in the exemplary PDL procedures provided herein, "pCell" and "pBlock" together comprise the internal identifier. Except in those cases where intimate access is allowed by a supplier block, pCell is null; when intimate access is allowed, pCell indicates the exact memory location (i.e., address) of the parameter within the supplier block. When pCell is null, pBlock is used; it indicates the memory location of the supplier block itself so that generic access methods (defined herein as "method" access), such as the Get( ) or Store( ) procedures, can be invoked upon the supplier block. As implied by their names, "pCell" and "pBlock" can be thought of as "pointers;" it is within the scope of the invention, however, that the internal reference may take a form other than a pointer, e.g., memory handles with associated offsets could be used instead of pointers.

The present invention introduces procedures through which a data owner (i.e., a block) can selectively allow intimate access to that data by another block; herein, those procedures are named "BindGet( )" and "BindStore( )." To illustrate the principles of the present invention, TABLES 1 and 2 provide C-like Program Design Language ("PDL") descriptions, at a high level of abstraction, for exemplary BindGet( ) and BindStore( ) procedures, respectively, for the exemplary software-definable application 300 illustrated in FIG. 3; those skilled in the art will readily perceive of equivalent procedures for other specific software-definable applications. Those skilled in the art are familiar with the use of PDL to describe the functional requirements of software-definable processes; the principles of the present invention are not limited, however, to a particular procedure or specific code used to define such procedures. Those skilled in the art will readily perceive of many equivalent means of implementing the principles of the presenting invention, such equivalent means intended to be within the scope of the claims recited hereinafter.

As illustrated by the exemplary BindGet( ) procedure provided in TABLE 1, BindGet( ) receives the value "ParameterIdentifier" as an input argument which identifies which parameter is being referenced and allows supplier block SB1 to determine which of its parameters requires binding. BindGet( ) returns data which identifies the type of binding supported for the parameter; this data is called "BoundParameterReference" in the example. The information in BoundParameterReference is ultimately stored within a connector, instantiated by client block CB, as the values of "pCell" and "pBlock." In one embodiment, the BindGet( ) procedure is called as part of the set-up operation for client block CB.

TABLE 1

```
switch (ParameterIdentifier) {
    case OP1:
        assign value to BoundParmeterReference for intimate access;
        break;
    case . . . :
        assign value to BoundParameterReference as appropriate for this
        parameter;
        break;
    default: // ParameterIdentifier is invalid if get to here.
        assign null value to BoundParameterReference;
}
return (BoundParameterReference);
```

As illustrated by the exemplary BindStore( ) procedure provided in TABLE 2, BindStore( ) receives the value of ParameterIdentifier, as an input argument, to identify the parameter for which binding is being requested. BindStore( ) returns "BoundParameterReference," which is ultimately stored in a connector, instantiated by client block CB, as the values of pCell and pBlock. In one embodiment, the BindStore( ) procedure is called as part of the set-up operation for client block CB.

TABLE 2

```
switch (ParameterIdentifier) {
    case IP2:
        assign value to BoundParmeterReference for method access;
```

TABLE 2-continued

```
        break;
    case . . . :
        assign value to BoundParameterReference as appropriate for this
        parameter;
        break;
    default: // ParameterIdentifier is invalid if get to here.
        assign null value to BoundParameterReference;
}
return (BoundParameterReference);
```

For purposes of illustration, suppose a bind request results in a call to the BindGet( ) procedure which, according to the principles of the present invention, is coded by a block designer to evaluate whether intimate Get access is supported for the parameter being referenced. If intimate access is supported, the BindGet( ) procedure returns an internal form of reference which allows identification of the exact memory cell or cells (i.e., the address) at which the parameter is stored. The address information is passed back to the client block that requested access to be used at run time to perform direct read access to the designated cells. If the block designer has implemented the BindGet( ) procedure to disallow intimate access for the particular referenced parameter, a different form of reference is returned; the reference returned refers to the block itself, rather than to cells within the block, and can be used by the client block to invoke a Get( ) procedure (i.e., "method" access) upon the supplier block, but not for intimate access.

The handling of "store" bind requests is substantially analogous to that for "get" bind requests. The major difference between the use of the BindGet( ) and BindStore( ) procedures is that for most applications, the BindGet( ) procedure preferably supports intimate access for considerably more parameters than the BindStore( ) procedure; intimate "get" access may be allowed more frequently than intimate "store" access because data reads are inherently safer than data writes. In addition, for most process control strategies, it is more common for store operations to have associated computations than for get operations; associated computations can only be performed if access is by method access, i.e., subroutine execution, which is not possible, or even desirable, when using intimate access.

A necessary requirement of the invention is that there be a way to encode the distinction between a reference which allows direct (i.e., intimate) access and a reference which only allows method access (i.e., access by subroutine execution); a client block, or an intermediary service used by a client block, must be able to detect this distinction in order to perform an access by the appropriate technique. There are many possible methods to encode the information necessary to indicate the desired manner of access; the principles of the present invention are not limited to a specific method, and those skilled in the art will readily perceive of equivalent technique. The method selected will depend, in part, on the form of memory management employed within the process controller in which the principles of the present invention are to be employed. In general, the reference must store enough information to identify the following: (1) whether intimate access is supported; (2) the location (i.e., memory address) of parameter storage cells if intimate access is supported; and (3) the location (i.e., memory address) of the supplier block if intimate access is not supported.

For purposes of illustration, assume that the memory management philosophy employed in an application is such that bound references are stored as simple, persistent pointers. Under this assumption, two pointers, pCell and pBlock, are sufficient to encode the reference information. The pCell and pBlock pointers can be stored together within a reference object, such as a "connector" as described herein. The exemplary PDL provided in TABLE 4 illustrates how these pointers could be used.

TABLE 3

```
if (Connector.pCell != Null) {
    access data intimately using Connector.pCell
}
else {
    access data by method using Connector.pBlock
}
```

In general, a connector should hold both the internal form of the reference, which is held in the values of pCell and pBlock, as well as the external form of the reference, which can be received as configuration data. Having both forms of reference allows a connector to trigger a binding procedure, as needed, in the event that reference information is received before a parameter definition exists.

When a reference is bound such that it supports intimate access, a client block preferably knows the data type of the referenced parameter in order to perform the desired access. A client block may come to know the data type in more than one way; the principles of the present invention are not limited to the manner in which a client block obtains the data type of a referenced parameter. As described below, two exemplary methods of obtaining data type information include: (1) implicit knowledge based on the data type of the associated parameter owned by the client block, or (2) explicit knowledge based on the data type storage within the connector associated with the referenced parameter.

Connections within a process controller application establish linkages between an output parameter of one block and an input parameter of a second block. For some process control applications, or portions thereof, the data type of input and output parameters is required to match exactly; in these applications, a client block can infer the data type of a referenced parameter from the data type of the associated parameter owned by the client block. For example, in a "pull" connection, a client block can infer the data type of the referenced output parameter from the data type of its input parameter; for a "push" connection, a client block can infer the data type of the referenced input parameter from the data type of its own output parameter. In the case of other process control applications, an exact match between the data types of the input and output parameters is not required and can not be assumed by a client block; in these applications, a client block must somehow learn the data type of the referenced parameter. The data type of a referenced parameter can be determined, for example, by storing the data type along with address data within the connector associated with the parameter; at the time of control strategy set-up, the connector can be initialized to hold both the address information and the data type information.

As illustrated by the exemplary Execute( ) procedure provided in TABLE 4 below, Execute( ) encodes most of the control algorithm implemented by client block CB. Depending on the specific requirements of client block CB, elements of the control algorithm may also be implemented by the Get( ) or Store( ) procedures for the blocks' parameters. In the exemplary PDL provided in TABLE 4, connector instances within client block CB are referred to as "IP1Connector" and "OP2Connector." The exemplary Execute( ) procedure assumes that IP1Connector and OP2Connector have been initialized to a useable state during the set-up operation for client block CB; it is also assumed that client block CB uses explicit, rather than implicit, determination of data type. Processing done within the Execute( ) procedure handles any runtime accesses associated with IP1Connector and OP2Connector, including intimate access Get( ) calls, or Store( ) calls, to supplier blocks.

TABLE 4

```
FLOAT IP1Temp;
if (IP1Connector.pCell ! NULL) {
    switch (IP1Connector.DataType) {
        case FloatDataType:
            IP1Temp = *((FLOAT*)IP1Connector.pCell);
            break:
        case INTDataType:
            IP1Temp = (FLOAT)*(((INT*)IP1Connector.pCell);
            break;
        case . . .:
            IP1Temp = . . .;
            break;
    }
}
else {
    call pBlock->Get (IP1Connector.ParameterIdentifier) to get parameter
      value.;
    cast received value to proper data type;
    store returned value in IP1Temp;
}
perform any required input conditioning on IP1Temp;
transfer IP1Temp to storage cell for IP1;
collect values associated with other input connectors;
perform required input conditioning on other input values;
transfer other input values to appropriate storage cells;
do algorithm computations to take input values into output values;
if (OP2Connector.pCell != NULL) {
    switch (OP2Connector.DataType) {
        case FloatDataType:
            FLOAT* pFloat = (FLOAT*)OP2Connector.pCell;
            *pFloat = OP2;
            break;
        case INTDataType:
            INT* pInt = (INT*)OP2Connector.pCell;
            *pInt = (INT)OP2;
            break;
        case . . .:
            break;
    }
}
else {
    case OP2 to proper data type for store and save in OP2Temp;
    call pBlock->Store(OP2Connector.ParameterIdentifier, OP2Temp) to
      store value of OP2Temp to referenced parameter;
    process return status as appropriate;
}
store values associated with other output connectors;
```

As illustrated by the exemplary Store( ) procedure provided in TABLE 5, for supplier block SB2 in the exemplary application 300, supplier block SB2 does not support intimate store access for input parameter IP2; thus, supplier block SB2 forces its store procedure, Store( ), to be called for any input connection to input parameter IP2. Supplier block SB2 may perform a set of algorithmic computations (not shown in TABLE 5) whenever input parameter IP2 is stored. The exemplary Store( ) procedure receives as input arguments the ParameterIdentifier and the value to be stored, which is passed in argument "InputValue;" the Store( ) procedure returns a "Status" value that indicates whether or not the store operation was successful.

TABLE 5

```
switch (ParameterIdentifier) {
    case IP2:
        check whether the value of InputValue is acceptable;
        store InputValue into IP2 storage cells;
        perform algorithm computations associated with IP2 store;
        break;
    case . . . :
        perform store processing appropriate to this parameter;
        break;
    default: // ParameterIdentifier is invalid if get to here.
        set Status to indicate error;
}
return (Status)
```

Execution of a Get( ) procedure for supplier block SB1 is not stimulated by the connections depicted in the exemplary application 300; the execution of a Get( ) procedure, however, might be stimulated, for example, by a parameter value request for supplier block SB1 originating from on-process displays. TABLE 6 illustrates an exemplary Get( ) procedure.

TABLE 6

```
switch (ParameterIdentifier) {
    case OP1:
        return value to parmeter OP1;
        break;
    case . . . :
        return value of this parameter;
        break;
    default: // ParameterIdentifier is invalid if we get to here.
        return status indicated parameter reference error
}
```

In summary, the invention described hereinabove provides a means for reducing processing overhead in an a process controller employing object-oriented software design. The method employed is to set up a binding process at configuration time in which a client block requests intimate address data about a parameter being referenced; a supplier block evaluates the request and decides whether or not to allow intimate access. If the supplier block decides to allow intimate data access, the supplier block provides the client block the address of the data; otherwise, the supplier block denies the intimate access and forces the client block to access the data through explicit subroutine calls at run time.

Previous process controller designs have implemented control algorithms and data as encapsulated objects. The major parts of an algorithm were expressed within, for example, an Execute( ) function, while access to parameter data was controlled through data owner functions, such as Get( ) and Store( ) as illustrated hereinabove. Previous controller designs, however, have not allowed access to parameters both indirectly, for example, through Get( )/Store( ) execution, and through direct, or "intimate," access. The present invention provides both direct and indirect methods of access without loosing the ability of a block owning requested data to control access thereto; a block owning a data parameter can decide whether intimate access will be allowed for each parameter, thereby allowing independent decisions about intimate read access and intimate write access for each parameter.

From the above, it is apparent that the present invention provides a system for, and method of, providing encapsulated and performance-efficient data references in an object-oriented controller and a distributed, real time process control system employing the system or the method. In one embodiment, the system includes: (1) a client algorithm block that generates a request for an address to enable the client algorithm block to gain direct access to data stored at the address and (2) a supplier algorithm block, that receives and evaluates the request and: (2a) if the supplier algorithm block grants the request, communicates the address to the client algorithm block, allowing the client algorithm block to gain direct access to the data and (2b) if the supplier algorithm block denies the request, withholds the address, forcing the client algorithm block to gain indirect access to the data. The invention allows block designers more control over the design of specific process control applications; if necessary, a block designer can disallow intimate access and force data reads or writes to go through subroutine execution, or "method" access, for a particular parameter. Alternatively, if subroutine execution is not desired, and it is more important to make read or write accesses efficient, a designer can allow intimate access.

Although the present invention and its advantages have been described in detail, those skilled in the art should understand that they can make various changes, substitutions and alterations herein without departing from the spirit and scope of the invention in its broadest form.

What is claimed is:

1. A system for providing encapsulated and performance-efficient data references in an object-oriented controller, comprising:
   a client algorithm block that generates a request for an address to enable said client algorithm block to gain direct access to data stored at said address; and
   a supplier algorithm block, that receives and evaluates said request and:
      if said supplier algorithm block grants said request, communicates said address to said client algorithm block, allowing said client algorithm block to gain direct access to said data, and
      if said supplier algorithm block denies said request, withholds said address, forcing said client algorithm block to gain indirect access to said data.

2. The system as recited in claim 1 wherein said client algorithm block generates said request at configuration time.

3. The system as recited in claim 1 wherein said supplier algorithm block forces said client algorithm block to gain indirect access to said data through an explicit subroutine call.

4. The system as recited in claim 1 wherein said supplier algorithm block evaluates said request based on predetermined rules associated with said supplier algorithm block.

5. The system as recited in claim 1 wherein said data is associated with a parameter, said parameter including information pertaining to at least one selected from the group consisting of:
   whether direct access is supported,
   a location of an associated cell if direct access is supported, and
   a location of said server algorithm block if direct access is not supported.

6. The system as recited in claim 1 wherein said address is contained in a persistent pointer associated with said client algorithm block.

7. The system as recited in claim 1 wherein said control system is a distributed, real time process control system.

8. A method of providing encapsulated and performance-efficient data references in an object-oriented controller, comprising the steps of:
   generating, with a client algorithm block, a request for an address to enable said client algorithm block to gain direct access to data stored at said address; and
   receiving said request into a supplier algorithm block, said supplier algorithm block evaluating said request and:
      if said supplier algorithm block grants said request, communicating said address to said client algorithm block, allowing said client algorithm block to gain direct access to said data, and
      if said supplier algorithm block denies said request, withholding said address, forcing said client algorithm block to gain indirect access to said data.

9. The method as recited in claim 8 wherein said step of generating is performed at configuration time.

10. The method as recited in claim 8 wherein said step of receiving comprises the step of forcing said client algorithm block to gain indirect access to said data through an explicit subroutine call if said supplier algorithm block denies said request.

11. The method as recited in claim 8 wherein said step of receiving comprises the step of evaluating said request based on predetermined rules associated with said supplier algorithm block.

12. The method as recited in claim 8 wherein said data is associated with a parameter, said parameter including information pertaining to at least one selected from the group consisting of:
   whether direct access is supported,
   a location of an associated cell if direct access is supported, and
   a location of said server algorithm block if direct access is not supported.

13. The method as recited in claim 8 wherein said address is contained in a persistent pointer associated with said client algorithm block.

14. The method as recited in claim 8 wherein said control system is a distributed, real time process control system.

15. A distributed, real time process control system, comprising:
   a plurality of sensors and controllable devices; and
   data processing and storage circuitry, associated with said plurality of sensors and controllable devices, operable as an object-oriented controller to:
      execute sequences of software instruction arranged in algorithm blocks containing referenced parameters relating to said plurality of sensors and controllable devices,
      generate, in a client algorithm block, a request for an address to enable said client algorithm block to gain direct access to data stored at said address, and
      receive said request into a supplier algorithm block, said supplier algorithm block evaluating said request and:
         if said supplier algorithm block grants said request, communicating said address to said client algorithm block, allowing said client algorithm block to gain direct access to said data, and
         if said supplier algorithm block denies said request, withholding said address, forcing said client algorithm block to gain indirect access to said data.

16. The system as recited in claim 15 wherein said client algorithm block generates said request at configuration time.

17. The system as recited in claim 15 wherein said supplier algorithm block forces said client algorithm block to gain indirect access to said data through an explicit subroutine call.

18. The system as recited in claim 15 wherein said supplier algorithm block evaluates said request based on predetermined rules associated with said supplier algorithm block.

19. The system as recited in claim 15 wherein said data is associated with a parameter, said parameter including information pertaining to at least one selected from the group consisting of:

whether direct access is supported, a location of an associated cell if direct access is supported, and a location of said server algorithm block if direct access is not supported.

20. The system as recited in claim 15 wherein said address is contained in a persistent pointer associated with said client algorithm block.

* * * * *